US006188353B1

(12) United States Patent
Mitchell

(10) Patent No.: US 6,188,353 B1
(45) Date of Patent: Feb. 13, 2001

(54) INTERBUILDING AND URBAN CANYON EXTENSION SOLUTION FOR GLOBAL POSITIONING SYSTEMS

(75) Inventor: James P. Mitchell, Cedar Rapids, IA (US)

(73) Assignee: Rockwell Science Center, Thousand Oaks, CA (US)

( * ) Notice: Under 35 U.S.C. 154(b), the term of this patent shall be extended for 0 days.

(21) Appl. No.: 09/346,574

(22) Filed: Jul. 1, 1999

Related U.S. Application Data

(63) Continuation of application No. 08/946,627, filed on Oct. 7, 1997, now Pat. No. 5,990,826.

(51) Int. Cl.[7] .............................. G01S 1/08; H04B 7/185
(52) U.S. Cl. ..................... 342/386; 342/357.06; 701/213
(58) Field of Search ..................... 342/357.01, 357.06, 342/386, 457, 463; 701/213

(56) References Cited

U.S. PATENT DOCUMENTS

| 4,274,083 | 6/1981 | Tomoeda | 340/171 |
| 4,350,970 | 9/1982 | von Tomkewitsch | 340/23 |
| 5,422,813 | 6/1995 | Schuchman et al. | 364/449 |
| 5,485,163 | 1/1996 | Singer et al. | 342/457 |
| 5,550,551 | * 8/1996 | Alesio | 342/457 |
| 5,650,770 | * 7/1997 | Schlager et al. | 340/573 |
| 5,652,570 | * 7/1997 | Lepkofker | 340/573 |
| 5,742,233 | * 4/1998 | Hoffman et al. | 340/573 |
| 5,751,246 | * 5/1998 | Hertel | 342/357 |
| 5,754,136 | * 5/1998 | Kojima et al. | 342/357 |
| 5,774,829 | * 6/1998 | Cisneros et al. | 701/213 |
| 5,808,564 | * 9/1998 | Simms et al. | 340/990 |
| 5,990,826 | * 11/1999 | Mitchell | 342/357.06 |

* cited by examiner

Primary Examiner—Thomas H. Tarcza
Assistant Examiner—Dao L. Phan
(74) Attorney, Agent, or Firm—Nathan O. Jensen; Kyle Eppele; J. P. O'Shaughnessy

(57) ABSTRACT

A global positioning system (GPS) and auxiliary receiver receive limited range position signals broadcasted from telemetry transmitters when in an urban canyon environment. The limited range receivers preferably are implemented as part of the lighting infrastructure of the environment. The limited range receivers derive power from light from the lighting infrastructure. The receivers can also include a transmitter for retransmitting the receive position data and an ID code to a central processing center.

20 Claims, 3 Drawing Sheets

INTERBUILDING AND URBAN CANYON EXTENSION SOLUTION FOR GLOBAL POSITIONING SYSTEMS

This Application is a Continuation of application Ser. No. 08/946,627 filed Oct. 7, 1997, now U.S. Pat. No. 5,990,826 entitled "Interbuilding And Urban Canyon Extension Solution For Global Positioning Systems" by James P. Mitchell.

FIELD OF THE INVENTION

The present invention relates to terrestrial navigation and positioning systems. More particularly, the present invention relates to an extended capability global positioning system (GPS) capable of resolving position without access to line-of-sight satellite, pseudolite or cellular telephone signaling.

BACKGROUND OF THE INVENTION

Global positioning system (GPS) navigational systems are often used by military and civilian naval, ground, and airborne vehicles for navigation. GPS receiver units receive positioning signals from a constellation of 24 Navistar satellites deployed in 12-hour orbits about earth and dispersed in six orbital planes at an altitude of 2,200 kilometers. The satellites continuously emit electronic GPS signals (or telemetry) for reception by ground, airborne, or naval receiver units. By receiving GPS signals from four or more satellites, a properly configured receiver unit can accurately determine its position in three dimensions (e.g., longitude, latitude, and altitude).

GPS navigational systems have tremendous benefits over other positioning systems in that these systems do not rely upon visual, magnetic, or other points of reference. However, conventional GPS navigational systems can experience blackout areas or regions when line-of-site is broken with the satellites. Some GPS navigational systems or other navigational systems in use today are nonfunctional in many areas due to signal blockage. For example, personal navigational systems often experience loss of signal when they are operated indoors, in dense urban environments (e.g., urban canyon), next to large buildings, underground, or in other blackout areas. Additionally recent attempts at augmenting GPS for this coverage deficiency has had mixed success and not resulted in a low cost worldwide solution. Additionally, approaches for resolving location through the novel use of cellular phone infrastructures does not currently provide reliable or sufficient discrimination for resolving occupied floor level within a multi-story concrete and metal building. Similarly, the approach of using GPS pseudolites does not solve all coverage problems due to inherent signal distortion, reflection and attenuation again brought on by the use of concrete and metal in many buildings. Furthermore the payback incentives are not clear, resulting in questions of who should pay for the new infrastructure, undermining solution standardization and widespread system implementation and coverage.

Thus, there is a need for a navigational system which not only is less susceptible to blackout areas, but is inherently low cost and having characteristics attracting widespread or worldwide infrastructure support. Further still, there is a need for a low-cost personal location system which can be utilized to determine position indoors. Even further still, there is a need to extend satellite navigation systems so they can be used indoors and in urban canyon environments.

SUMMARY OF THE INVENTION

The present invention relates to a transmitter disposed at a position for use in a positioning system. The transmitter includes a wireless power circuit and a control circuit. The control circuit is coupled to the wireless power circuit. The wireless power circuit provides electric power to the control circuit. The control circuit transmits a limited range positioning signal indicative of the position.

The present invention further relates to a receiver unit for use with a plurality of transmitters. Each transmitter emits a limited range receive position signal indicative of a position of the transmitter. The receiver unit includes a receiver circuit for receiving the limited range receive position signal, a transmitter circuit, and a storage buffer. The storage buffer is coupled to the transmitter circuit. The storage buffer stores an identification code. The transmitter transmits a transmit position signal indicative of the limited range receive position signal and the identification code.

The present invention still further relates to a positioning system receiver including a satellite receiver circuit and an auxiliary receiver circuit. The satellite receiver circuit receives satellite signals and determines a first position in response to the satellite signals. The auxiliary receiver circuit receives limited range signals and determines a second position in response to the limited range signals. The limited range signals include a positioning code. The auxiliary receiver circuit utilizes the position code to determine the second position.

According to one exemplary aspect of the present invention, a global terrestrial based system includes uniquely programmed miniature transmitters, each with limited broadcast range and massively deployed in fixed locations for use within a positioning system. These transmitters each include a wireless power circuit, control circuit, programmable memory buffer, radio frequency (RF) oscillator-amplifier, and antenna system. In its most ideal form, the power circuit is designed to obtain its operating energy parasitically and wirelessly from a pre-existing distributed utility infrastructure (e.g. street and building lighting, telephone, a.c. power etc.), converting and providing electric power to the control, memory, and RF circuits. The control circuit is designed to repeatedly deliver (about once a second) a unique pre-programmed code from the memory buffer to the RF amplifier. The resultant modulated RF carrier signal broadcast is regulated to be limited in propagation range. The broadcast range and on-the-air duty cycle may be selected at the time of installation for optimum performance with intended user navigation habits and available power. E.g., Variables such as typical user travel speed and typical navigator distance from said transmitter are factors that would influence desired effective radiated broadcast power and data broadcast periodicity respectively. Broadcast power, broadcast frequency, antenna design, and power supply are selected and installed accordingly, ensuring maximal likelihood of navigator signal reception. The pre-programmed position codes stored within each transmitter memory unit are uniquely prescribed at the time of installation, or in advance, based on survey or other mathematically derived means. Passing navigator signal data reception yields discrete information points indicative of last known general user position. The transmitters may be fielded at a variety of adjacent distances and power levels providing broadcast coverage ranging from a continuous two or three dimensional fine grid, to a one-dimensional discontinuous corridor arrangement.

In accordance with another exemplary aspect of the present invention, a receiver unit is for use with plurality of asynchronous gridded transmitter units. The receiver unit is capable of detecting low-power digital broadcast transmissions from any one of the independently fielded transmitter units, provided that the receiver distance is within local broadcasting range (a few feet to several hundred feet). A receiver discrimination circuit accepts the strongest navigation signal exceeding a preset detected energy level. Additionally the receiver includes a data buffer, display, and/or an optional embedded repeater circuit for the purpose of further relaying of received position data along with a user receiver identification code. Other parties equipped with a appropriately tuned receiver may independently monitor navigator's position.

The present invention still further relates to a unified receiver positioning system that incorporates a satellite GPS receiver with the aforementioned receiver invention. In response to the valid detection of a GPS satellite signal (first receiver), the unified system reports to the user interface a GPS position location indication. In response to the valid detection of a local fixed point broadcast signal from the terrestrially based transmitter grid (second receiver), the unified system may additionally report to the user, secondary receiver position detection, or in the event of the extended loss of reliable GPS data, secondary receiver data becomes primary. Upon regaining reliable GPS satellite signaling, the unified receiver control reselects the GPS data as primary. Receiver "handoff" time constants are made programmable for particular acceptable use.

In yet another exemplary aspect of the present invention, the limited range low-power fixed point broadcast transmitter grid is provided in concert with a pre-existing lighting infrastructure (e.g. building corridor and/or street lights). The miniature transmitters parasitically and wirelessly derive power from the lighting infrastructure via a small solar cell. The transmitters are preferably affixed to the lighting fixtures, may be integrated with lighting hardware, or may be temporarily associated with or permanently part of a bulb design. Additionally the transmitters can utilize existing or additional mounting or reflecting hardware to focus, attenuate, or otherwise control RF propagation of the position signal. Pre-existing lighting infrastructure is generally designed and appropriately concentrated for use benefiting human navigation. It is noted that the relationship of existing navigational lighting infrastructure in urban areas to be intentionally and highly correlated with building and transportation infrastructure density due to solar light broadcast attenuation and evening use. In a very related manner, it is these infrastructures that are also the primary cause for reduced performance and availability of GPS signal broadcasts to these same areas. An exemplary aspect of the present invention is the recognition of these similar problems, both relating to navigation enhancement, and addressed by uniting the use of existing world-wide point source lighting infrastructures with point source RF navigation related broadcasting. Invention application hence results in the simultaneous navigation utility extension of pre-existing worldwide urban lighting infrastructure and GPS satellite based positioning systems. Furthermore, a unique set of conditions essential for the feasibility of low cost global implementation has been addressed and realized by the invention. The power circuit design using the principle of wireless and parasitic energy derivation from said associated lighting infrastructure, significantly reduces required installation labor time and skill level. It is additionally noted that the invention and its power circuits uniquely meet a balance of providing adequate power for a required useful point broadcast while having minimal obtrusive effect on intended fixture lighting performance.

BRIEF DESCRIPTION OF THE DRAWINGS

The invention will hereafter be described with reference to the accompanying drawings, wherein like numerals denote like elements, and:

FIG. 1 is a schematic block diagram of an urban canyon environment employing transmitters in accordance with an exemplary embodiment of the present invention;

DETAILED DESCRIPTION OF THE PREFERRED EMBODIMENTS

Figure 2A:
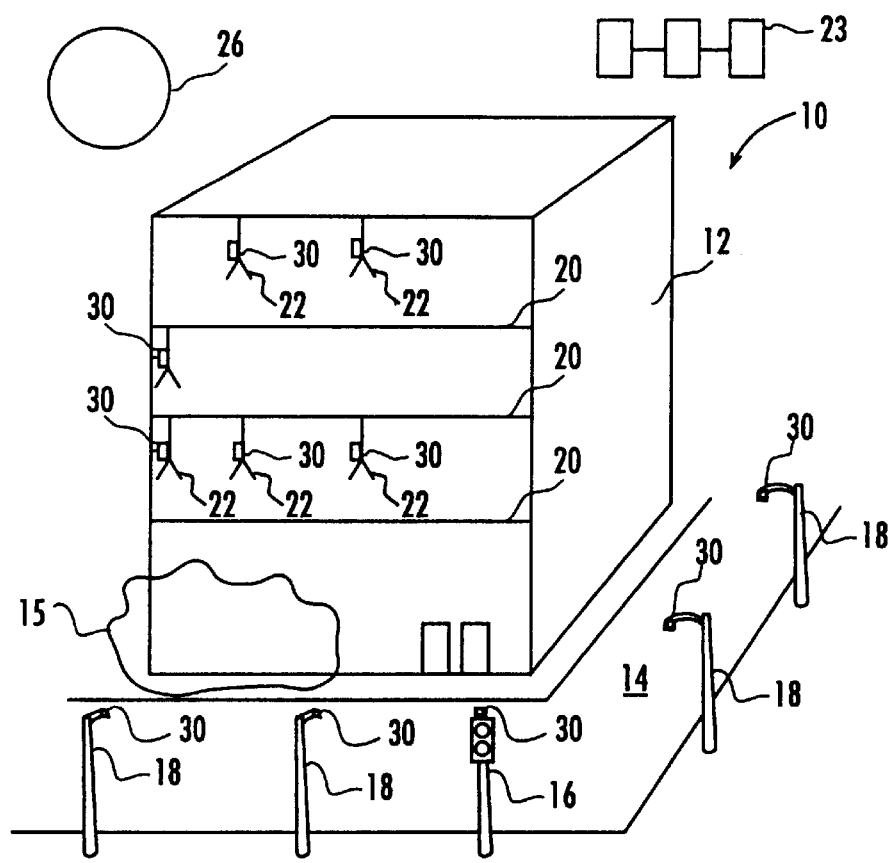
FIGS. 2A and 2B show the employment of the transmitters illustrated in FIG. 1 upon lighting hardware in accordance with another exemplary embodiment of the present invention.

With reference to FIG. 1, an urban canyon environment 10 includes a building 12 situated on a street corner 14. Street corner 14 includes a stop light 16 and street lights 18. Building 12 is comprised of a number of floors 20 which include lights 22.

Urban canyon environment 10 relates to any area or location where satellite signals, such as, signals from global positioning system (GPS) satellites, such as, satellite 23 are detrimentally attenuated, blocked, or distorted by geological or man-made structures. For example, building 12 may prevent the satellite signals from reaching street corner 14 or GPS black out zone 15. Additionally, building 12 may prevent the satellite signals from reaching areas on floors 20 within building 12. Environment 10 can be any location where there is not a clear line-of-sight to positioning satellites or where the satellite signals cannot be accurately received.

In accordance with an exemplary embodiment, the global positioning system (GPS) is augmented with transmitters 30 throughout environment 10. Transmitters 30 are linked to the lighting infrastructure (e.g., lights 22 and street lights 18) within building 12 and on street corner 14. For example, transmitters 30 can be attached or integrated with the light bulbs or lighting hardware associated with lights 22 or street lights 18. Similarly, traffic light 16 may include a transmitter 30. By utilizing the lighting infrastructure associated with environment 10, transmitters 30 can provide positioning information to environment 10 at substantially less cost since the hardware associated with street lights 18 and lights 22 is already present and in significant concentration for use relating to human navigation. Placement and use scenarios can include public or private highways, roads, streets, parking facilities, bridges, overpasses and tunnels etc. Additionally building stairways, hallways, offices, rooms, auditoriums, corridors, and basements etc. can be complemented with devices.

Transmitters 30 are preferably very low power transmitters which broadcast unique position codes as a low-level limited range position signal. The position signal includes position information modulated on a carrier wave. Preferably, the useful range of transmitters 30 is selected to be several feet to a few hundred feet. For example, the range of transmitter 30 can be three feet, ten feet, or other distance necessary to accurately approximate the position of a receiver (not shown in FIG. 1) in environment 10.

Transmitters 30 are preferably programmed, as discussed below with reference to FIG. 6, to broadcast a particular position code or program position signal with each location. Transmitters 30 can be programmed via a hardwire, optical, or RF programming technique. The position signal can include three-dimensional position information, such as, longitude, latitude, and altitude or street address, floor number, building name, room number, or other location information. Unlike satellite signals, the broadcast is directly encoded with unique position signal. Thus, position information does not need to be derived from a comparison of synchronized signals from multiple sources, as in a GPS navigational system.

Transmitters 30 also advantageously utilize the lighting infrastructure to derive power. For example, transmitters 30 can utilize energy associated with lights 18 and 22 via solar cells or panels. inductive a.c. power coupling or other techniques, for deriving energy from the lighting infrastructure. Preferably, transmitters 30 do not require a direct electrical connection between the lighting infrastructure to derive power (e.g., wireless derivation of power). Transmitters 30 may include recharging capacitor and battery circuits to store power when lights 22 or street lights 18 are off or during twilight periods. Further, transmitters 30 disposed on street lights 18 and traffic light 16 can derive power from the solar broadcast of sun 26 during daylight hours.

Figure 2B:
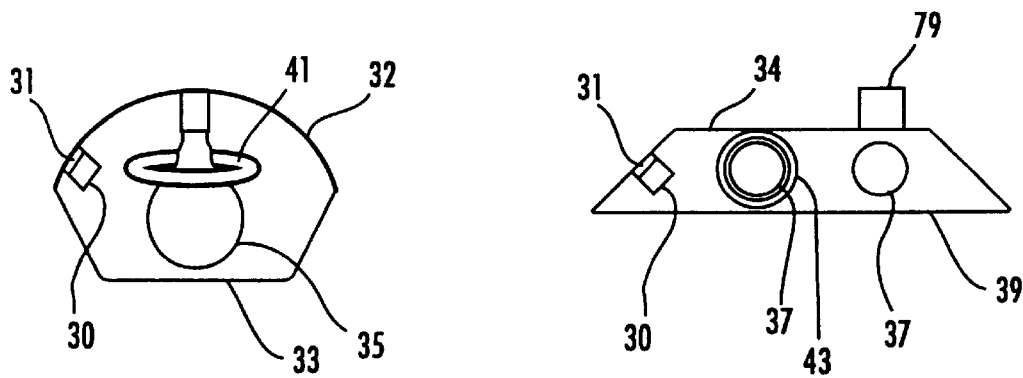

With reference to FIGS. 2A and 2B, transmitters 30 can be disposed on light shield 32 or light shield 34. Light shield 32 is associated with a street light 18 or an incandescent light bulb 35, and light shield 34 is associated with fluorescent light tubes 37. Shields 32 and 34 as well as diffusers 33 and 39 provide a convenient space for attaching transmitters 30 and operate to focus, or to act as a radio frequency (RF) attenuator or shield that inhibits or limits the broadcast of the position signal to a particular zone or area. For example, if shield 34 is utilized on lights 22, transmitter 30 is less likely able to transmit its RF or position signal above to another floor 20 because shield 34 blocks the transmission of the position signal. Preferably, the RF frequency of the position signal from transmitter 30 is chosen to be beneficial with the size and shape of shields 32 and 34.

Transmitters 30 can be attached to reflectors, diffusers, transformers, ballasts, bulbs, sockets, connectors, bases, filliments, lenses or shields (32 and 34), by a magnet, a threaded housing, an adhesive 31, mechanical hardware (e.g., brackets and screws), Velcro™, or other attachment devices. Alternatively, transmitters 30 can be integrated within a light bulb 35 or light tubes 37. In an other alternative, transmitters 30 can be provided in toroidal or doughnut-shaped packages 41 and 43 which surround bulb 35 or tube 37, respectively. Light bulbs 35 and light tubes 37 can be halogen bulbs, sodium vapor bulbs, fluorescent bulbs, or incandescent bulbs.

Figure 3:
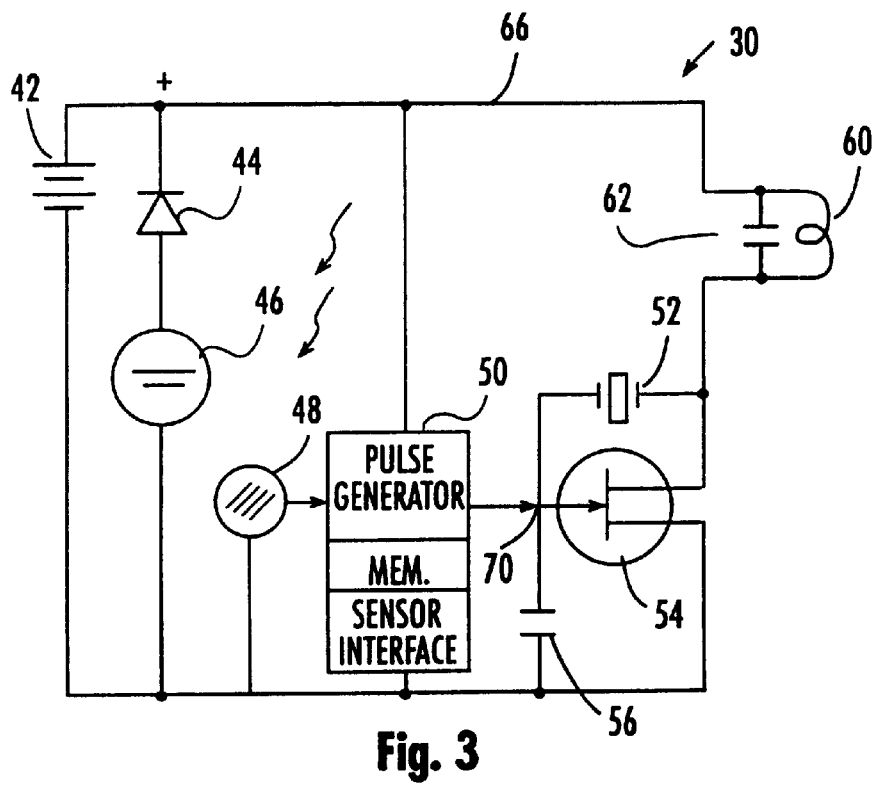
FIG. 3 is an electrical schematic drawing of the transmitter illustrated in FIG. 1.

With reference to FIG. 3, an electrical schematic drawing of transmitter 30 includes a battery or capacitor or battery/capacitor 42, a diode 44, a solar cell 46, an infrared interface 48, a control circuit 50, a crystal 52, a field effect transistor (FET) 54, a capacitor 56, a loop and/or straight antenna 60, and a capacitor 62. Diode 44 can be removed from transmitter 30 if solar cell 46 is utilized. The operation of transmitter 30 is discussed below with reference to FIG. 3.

Solar cell 46 is a wireless power circuit which receives light from the lighting infrastructure associated with building 12 and street corner 14 (FIG. 1) and generates power which is stored in battery/capacitor 42. Preferably, solar cell 46 provides three volts at node 66 in response to light from lights 16, 18, 22, or sun 26. Alternatively, cell 46 can be an inductive transformer or other device for parasitically deriving power without direct electrical contact. Control circuit 50 receives the power signal at node 66 and provides a gate signal representative of position data stored in circuit 50 to a gate 70 of FET 54.

The gate signal is mixed with a synthesized signal from the oscillator which is comprised of crystal 52, antenna 60, capacitor 62, FET 54 and capacitor 56. Preferably, the oscillator source is a carrier signal chosen for optimal broadcast propagation and attenuative characteristics within buildings. Additionally, the oscillator frequency is chosen for low circuit energy dissipation, small antenna profile and also with regard to available frequency band (e.g., 49.00 or 800 Mhz TSM frequency bands), with a small loop and/or straight wire antenna). FET 54 provides a resultant modulated carrier signal through antenna 60 as the position signal. The position signal includes the gate signal which represents the position data associated with the location of transmitter 30. Thus, the position signal includes the position data encoded onto the carrier signal through amplitude modulation (AM). Alternatively, other modulation (narrow band and wide band) or encoding techniques can be utilized to transmit a position signal representative of the position data.

Control circuit 50 can include digital logic, microcontroller, or other device for generating the gate signal provide to gate 70. Control circuit 50 is preferably a custom-designed integrated circuit for periodically providing the gate signal representative of the position data to gate 70. The components of transmitter 30 can be mounted to or on solar cell 46. Control circuit 50 includes a buffer or memory circuit, a sensor interface, and a pulse generator for providing the gate signal to gate 70. Alternatively, the position signal can be visible or infrared light, audio, laser, electromagnetic, or other type of signal. The components of ET transmitter 30 control circuit 50.

Additionally, the memory within control circuit 50 can be programmed by providing signals through infrared interface 48 or in combination or exclusively with panel 46 by modulating the power bias input. Alternatively, infrared interface 48 can be replaced by an RF interface, a hard wire interface, or other programmable system. Preferably, the position data is field programmable into the memory in control circuit 50 as discussed with reference to FIG. 6. The memory in control circuit 50 is non-volatile.

Antenna 60 is preferably a loop, wire, or hybrid combination broadcasting antenna of relatively small size, optimized for broadcast propagation control. The position signal, provided through antenna 60, preferably has a very low amplitude level, ranging from sub-milliwatt to 10's of milliwatts depending on application requirements.

Figure 4:
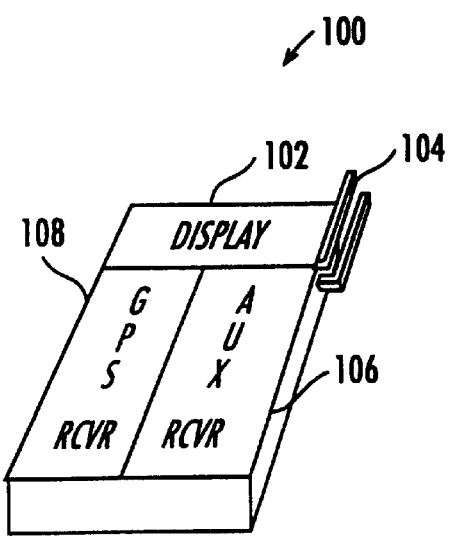
FIG. 4 is a schematic block diagram of a receiver for use with the system illustrated in FIG. 1 in accordance with another exemplary embodiment of the present invention.
Figure 5:
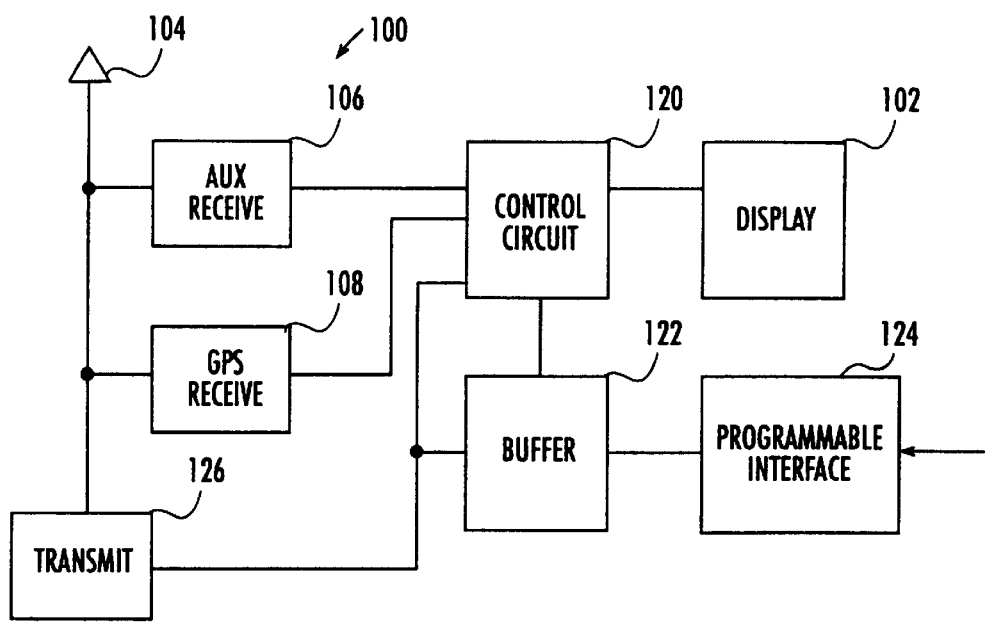
FIG. 5 is a more detailed schematic block diagram of the receiver illustrated in FIG. 4.

With reference to FIGS. 4 and 5, a positioning receiver 100 for use in environment 10 includes a display 102, an antenna 104, and auxiliary receiver 106, and a GPS receiver 108. Antenna 104 can be one, two, or multiple antennas. Receiver 100 also includes a control circuit 120 (FIG. 5), a buffer 122, a programmable interface 124, and a transmit circuit 126. Receiver 100 can be a hand-held receiver or otherwise attached to a person. Alternatively, receiver 100 can be attached to a vehicle. Receiver 100 can also be part of a two-way transceiver, a cellular telephone or a GPS receiving system.

Control circuit 120 is coupled to display 102 to provide information to display 102, providing visual indicia of the position of receiver 100. Control circuit 120 receives position data from auxiliary receiver 106 and from GPS receiver 108 to provide the display signal to display 102. Preferably, control circuit 120 indicates on display 102 from which receiver 106 or 108 the position data is received.

Auxiliary receiver 106 receives position signals from transmitters 30 in environment 10 (FIG. 1) and provides the position data to control circuit 120. Similarly, GPS receiver 108 receives GPS satellite signals from satellites on antenna 104 and provides the position data to control circuit 120. Generally, control circuit 120 chooses the position data from receiver 108 because it is often available.

As a user enters urban canyon environment 10, control circuit 120 determines that satellite signals are not being received by GPS receiver 108 and determines if position signals are being received by auxiliary receiver 106. If position signals of high enough levels are being received by auxiliary receiver 106, and the satellite signals are not being accurately received by receiver 108, control circuit 120 selects the position data from auxiliary receiver 106. Alternatively, control circuit 120 can wait a predetermined amount of time from when GPS receiver 108 no longer receives satellite signals before analyzing the position signals received by auxiliary receiver 106. In this way, receiver 100 can be utilized in urban canyon environment 10 and also in non-urban canyon environments. Therefore, receive 100 can provide accurate positioning wherever transmitters 30 are provided or satellite signals can be received.

Receiver 100 can also be utilized as a personnel locator. For example, receiver 100 can be worn or carried by a fire-fighter in a fire-fighting situation. If building 12 were on fire, receiver 100 could be utilized by a firefighter not only to determine a position in building 12, but also to relay that position to a fire truck, a fire station, or other control centers. In such an embodiment, control circuit 120 would provide the position data from receiver 106 or receiver 108 and identification data from buffer 122 to transmit circuit 126. Transmit circuit 126 would transmit the position data and the identification data in a transmit signal via antenna 104. Preferably, for fire-fighting situations, transmitters 30 and transmit circuit 126 emit RF signals which are not dramatically inhibited by smoky environments.

Buffer 122 stores the identification data or ID code. Buffer 122 can be a dip switch, PROM, S-RAM, FLASH PROM or other programmable device for long memory. Buffer 122 can be programmed via an interface 124 similar to interface 48 with reference to FIG. 3. Alternatively, programmable interface 124 can be switches, an RF interface, or other device for setting an ID code in buffer 122.

Transmit circuit 126 can be similar to transmitter 30. However, transmit circuit 126 preferably has significantly more power to transmit the position and identification data (transmit signals) farther distances. Control circuit 120 can be configured so transmit circuit 126 rebroadcasts the position signal each time new position data is detected by receiver 106 or by receiver 108. The rebroadcasted signal can be received by a fire truck, law officer or other command center authorized to receive such information. Additional system uses include vehicle location, personnel location, cellular telephone transmit power requirement estimations, emergency 911 locating, personnel or asset tracking. In addition to navigation uses, said point broadcast transmitters may be equipped and/or designed to accept and store other information relating to position environment, including sensory data for associative broadcast with position code. Uses may include hazardous material awareness or building heating, ventilating, and air-conditioning (HVAC) sensory feedback system uses. The latter use would include a sensory interface and data buffer as part of the miniature transmitter design. The position location broadcast would then include limited environmental history data for optimal heating and cooling regulation. Regular cleaning or maintenance crews could passively collect sensory data history via a personal receiver for later downloading and use at a central building HVAC control center. These safety, communication and energy use aspects address worldwide concerns providing natural incentive for widespread system implementation.

Figure 6:
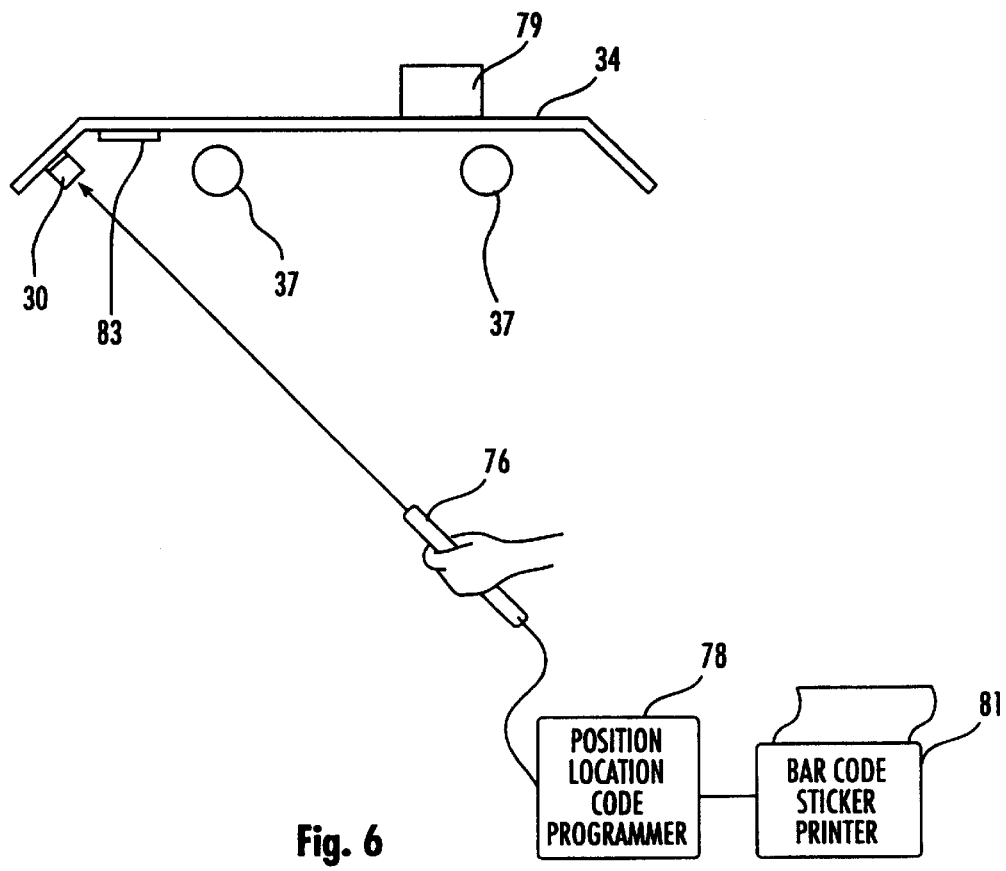
FIG. 6 is a schematic block diagram showing the transmitter illustrated in FIG. 2B being programmed in accordance with still another exemplary embodiment of the present invention.

With reference to FIG. 6, before or after transmitter 30 is installed on shield 34, a hand-held unit 76 coupled to a position location code generator 78 can provide prescribed position data to control circuit 50 within transmitter 30 (FIG. 3). Shield 34 is coupled to a ballast transformer 79 which can inductively provide power to transmitter 30. Position location code generator 78 can include a calibrated inertial positioning system or other device for providing the position code through wand 76. Generator 78 can also be coupled to a bar code printer 81 for providing a bar code sticker 83 which can be affixed to shield 34. Sticker 83 includes position information which can be utilized for future servicing of transmitter 30. Wand 76 can be configured to scan and read sticker 83. Alternatively, generator 78 can simply include a user interface for manually inputting the position data based upon maps, charts, or other devices. Wand 76 transmits the position data to interface 48 within transmitter 30 (FIG. 3).

It is understood that, while the detailed drawings, specific examples, and particular components values given describe preferred embodiments of the present invention, they serve the purpose of illustration only. The apparatus of the invention is not limited to the precise details, distances, voltages, frequencies, and conditions disclosed. For example, although particular wireless power systems are disclosed, other types of power systems can be utilized. Further, single lines in the various can represent multiple conductors. Various changes can be made to the details disclosed without departing from the scope of the spirit of the invention which is defined by the following claims.

What is claimed is:

1. An extended capability global positioning system comprising:
    a plurality of transmitters disposed at a plurality of positions for transmitting limited range position signals indicative of the plurality of positions;
    a lighting infrastructure whereon the plurality of transmitters are disposed; and
    a positioning receiver for receiving GPS signals from the global positioning system for determining a positioning receiver first position in response to the GPS signals, for receiving a limited range position signal from a transmitter in the plurality of transmitters for obtaining a positioning receiver second position in response to the limited range signal indicative of a known transmitter position, and for selecting the positioning receiver second position when the GPS signals are not being accurately received.

2. The extended capability global positioning system of claim 1 wherein the transmitter in the plurality of transmitters further comprises a wireless power circuit for powering the transmitter from the lighting infrastructure.

3. The extended capability global positioning system of claim 2 wherein the wireless power circuit comprises one of a solar cell and an inductive coupling.

4. The extended capability global positioning system of claim 2 wherein the transmitter in the plurality of transmitters further comprises an interface for programming the known transmitter position and a memory for storing the known transmitter position programmed through the interface for programming.

5. The extended capability global positioning system of claim 4 wherein data associated with the known transmitter position is programmed through the interface for programming and stored in the memory.

6. The extended capability global positioning system of claim 4 wherein the interface for programming is one of the group consisting of an infrared interface, a RF interface, a hard wire interface, and a modulated wireless power circuit interface.

7. The extended capability global positioning system of claim 4 wherein the transmitter further comprises a sensor interface for programming sensory data associated with the known transmitter position into the memory through the sensor interface for transmission of the sensory data by the transmitter.

8. The extended capability global positioning system of claim 7 wherein the sensory data is indicative of hazardous material or hazardous conditions.

9. The extended capability global positioning system of claim 2 wherein the lighting infrastructure further comprises a light apparatus whereon the transmitter is disposed and for supplying power to the wireless power circuit for powering the transmitter.

10. The extended capability global positioning system of claim 9 wherein the transmitter in the plurality of transmitters is mounted on the light apparatus.

11. The extended capability global positioning system of claim 9 wherein the transmitter in the plurality of transmitters is integrated within the light apparatus.

12. The extended capability global positioning system of claim 11 wherein the transmitter in the plurality of transmitters is integrated within a light bulb.

13. The extended capability global positioning system of claim 9 wherein the light apparatus further comprises mounting and reflecting hardware for focusing and attenuating the limited range position signal transmitted by the transmitter.

14. The extended capability global positioning system of claim 1 wherein the positioning receiver further comprises a GPS receiver for receiving GPS signals, an auxiliary receiver for receiving limited range position signals, and a control circuit for selecting the auxiliary receiver when the GPS receiver is no longer accurately receiving signals.

15. The extended capability global positioning system of claim 1 wherein the positioning receiver further comprises a transmitter for transmitting an identification code for the positioning receiver and the positioning receiver first position or positioning receiver second position.

16. An extension system for a global positioning system comprising:

a plurality of transmitters disposed at a plurality of positions for transmitting limited range position signals indicative of the plurality of positions said transmitters further comprising wireless power circuits for powering the transmitters and programming interfaces for programming the plurality of positions;

a lighting infrastructure said lighting infrastructure further comprising light apparatuses for disposing the plurality of transmitters thereon and for supplying power to the wireless power circuits for powering the transmitters; and a positioning receiver for receiving positioning signals said positioning receiver further comprising:
 a GPS receiver for receiving GPS signals from the global positioning system for determining a positioning receiver first position in response to the GPS signals;
 an auxiliary receiver for receiving a limited range position signal from a transmitter in the plurality of transmitters for determining a positioning receiver second position in response to the limited range signal indicative of a known transmitter position;
 a control circuit for selecting the positioning receiver second position when the GPS signals are not being accurately received; and
 a transmitter for transmitting an identification code for the positioning receiver and the positioning receiver first position or positioning receiver second position.

17. The extension system for a global positioning system of claim 16 wherein the transmitters further comprise:

control circuits coupled to the wireless power circuits for receiving power, for storing the known transmitter positions received from the programming interfaces, and generating gate signals representative of the stored transmitter positions; and oscillator circuits for generating carrier signals modulated by the gate signals representative of the stored known transmitter positions and for the transmitting limited range position signals indicative of the known transmitter positions.

18. The extension system for a global positioning system of claim 17 wherein the control circuits further comprise storage buffers for storing the known transmitter positions received from the programming interface and for storing environmental information related to the transmitter positions.

19. The extension system for a global positioning system of claim 16 wherein the known transmitter positions are selected from the group consisting of longitude, latitude, and altitude; street address; floor number; building name; room number; column number; aisle number; and office number.

20. The extension system for a global positioning system of claim 16 wherein the transmitters transmit at a selectable low power level with a range of several feet to a few hundred feet.

* * * * *